(12) United States Patent
Beutler et al.

(10) Patent No.: US 6,395,824 B1
(45) Date of Patent: May 28, 2002

(54) AQUEOUS DISPERSIONS CONTAINING POLYURETHANES WITH CARBODIIMIDE GROUPS

(75) Inventors: Kuno Beutler, Lambsheim; Karl Häberle, Speyer; Rainer Hummerich, Worms; Ulrike Licht, Mannheim; Nicolas Kokel, Ludwigshafen; Reinhard Treiber, Leimen; Helmut Kaehs, Niederkirchen; Ralf Mossbach, Lambrecht; Thomas Götz, Kuhardt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/463,579

(22) PCT Filed: Jul. 20, 1998

(86) PCT No.: PCT/EP98/04483

§ 371 (c)(1),
(2), (4) Date: Jan. 28, 2000

(87) PCT Pub. No.: WO99/06459

PCT Pub. Date: Feb. 11, 1999

(30) Foreign Application Priority Data

Jul. 31, 1997 (DE) .......................................... 197 33 044
Apr. 15, 1998 (DE) .......................................... 198 16 528

(51) Int. Cl.$^7$ .............................. C08J 3/00; C08K 3/20; C08L 75/00; B05D 3/02; B32B 27/00
(52) U.S. Cl. ................. 524/591; 427/372.2; 427/385.5; 428/423.1; 524/839; 524/840
(58) Field of Search ................................ 524/591, 839, 524/840; 427/372.2, 385.5; 428/423.1

(56) References Cited

U.S. PATENT DOCUMENTS

| 4,113,676 A | 9/1978 | Niederst |
| 4,910,339 A | * | 3/1990 | Henning et al. ............ 564/252 |

FOREIGN PATENT DOCUMENTS

| DE | 24 46 440 A | 4/1976 |
| DE | 40 39 193 | 6/1992 |
| EP | 198 343 A | 10/1986 |
| EP | 276 482 A2 | 8/1988 |
| EP | 207 414 B1 | 11/1992 |
| WO | WO 94/06852 | 3/1994 |
| WO | WO 95 08583 A | 3/1995 |
| WO | WO 96/08524 | 3/1996 |

* cited by examiner

Primary Examiner—Patrick D. Niland
(74) Attorney, Agent, or Firm—Oblon, Spivak, McClelland, Maier & Neustadt, P.C.

(57) ABSTRACT

Aqueous dispersions comprising a polyurethane which comprises carbodiimide structural units of the formula (I)

—N=C=N—   (I).

11 Claims, No Drawings

AQUEOUS DISPERSIONS CONTAINING POLYURETHANES WITH CARBODIIMIDE GROUPS

The present invention relates to aqueous dispersions comprising a polyurethane which comprises carbodiimide structural units of the formula (I)

$$—N{=}C{=}N— \tag{I}$$

The invention also relates to processes for coating, bonding and impregnating articles made from various materials with these dispersions and to the articles coated, bonded and impregnated with these dispersions.

The use of aqueous dispersions comprising polyurethanes (PU dispersions for short) for coating substrates such as textile or leather has long been known. Owing to their outstanding mechanical properties, PU dispersions based on polyesterols are preferably employed for this purpose.

In many cases the substrates thus coated are exposed to the influence of a warm and humid atmosphere. When this occurs it is found that the coatings lose their mechanical stability, as a result of hydrolytic degradation.

U.S. Pat. No. 4,113,676 discloses that aqueous PU dispersions can be protected against hydrolytic degradation by the addition of monocarbodiimides which carry no other functional groups. A disadvantage of these systems, however, is the presence of the low molecular mass carbodiimides, which may, for example, migrate from the coating and thus lead to hygiene problems. Another disadvantage is that the acylureas formed by reaction of the carbodiimide (CDI) with carboxyls split into amide and into the parent isocyanate of the CDI (Williams & Ibrahim; Chem. Rev. 81 (1981) 603), which may likewise migrate and cause problems.

WO 96/08 524, EP-A-207 414 and DE-A-4 039 193 describe aqueous dispersions of acylurea-comprising polyisocyanate adducts. To prepare them, first of all carbodiimide-containing polyurethanes or prepolymers are prepared and, before the polyurethanes are dispersed, the carbodiimide groups are reacted with carboxylic acids such as stearic acid to form the acylurea groups.

It is an object of the present invention to find PU dispersions which do not have the disadvantages of the prior art and from which it is possible to produce coatings and films which suffer no deterioration in their mechanical properties, especially their elongation at break, when stored under warm and humid conditions.

We have found that this object is achieved by the dispersions specified at the outset, by processes for producing coatings, bonds and impregnated materials and by the coated, bonded and impregnated articles themselves.

The novel dispersions comprise the carbodiimide structural units of the formula (I) preferably in amounts from 5 to 200, particularly preferably in amounts from 5 to 150 and, with very particular preference, in amounts from 10 to 100 mmol per kg of polyurethane.

A particularly simple way to incorporate the carbodiimide structural units of the formula (I) into the novel aqueous polyurethane dispersion is to construct the polyurethanes using, in whole or in part, diisocyanates (a1) which contain on average from 1 to 10, preferably from 1 to 4, structural units of the formula (I).

Examples of suitable diisocyanatocarbodiimides (a1) are those of the formula (Ia1)

$$OCN—(R^1—N{=}C{=}N)_m—R^1—NCO \tag{Ia1}$$

where $R^1$ is a divalent hydrocarbon radical with or without urethane, ester and/or ether groups, as is obtained by removing the isocyanate groups from a simple organic isocyanate or from a prepolymer which contains urethane groups and possibly ether or ester groups and which is terminated by isocyanate groups; if there are two or more radicals $R^1$ in the same molecule then different radicals $R^1$ conforming to the given definition may be present simultaneously; and
m is an integral or (on average) fractional number from 1 to 10, preferably from 1 to 4.

The radicals $R^1$ are preferably derived by abstracting the isocyanate groups from monomers (a) which are the diisocyanates commonly employed in polyurethane chemistry.

Monomers (a) are, in particular, diisocyanates $X(NCO)_2$, where X is an aliphatic hydrocarbon radical of 4 to 12 carbons, a cycloaliphatic or aromatic hydrocarbon radical of 6 to 15 carbons or an araliphatic hydrocarbon radical of 7 to 15 carbons. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI), such as the trans/trans, the cis/cis and the cis/trans isomer, and mixtures of these compounds.

Particularly important mixtures of these isocyanates are the mixtures of the respective structural isomers of diisocyanatotoluene and diisocyanatodiphenylmethane, especially the mixture comprising 80 mol-% 2,4-diisocyanatotoluene and 20 mol-% 2,6-diisocyanatotoluene. In addition, the mixtures of aromatic isocyanates such as 2,4-diisocyanatotoluene and/or 2,6-diisocyanatotoluene with aliphatic or cycloaliphatic isocyanates such as hexamethylene diisocyanate or IPDI are particularly advantageous, the preferred mixing ratio of aliphatic to aromatic isocyanates being from 4:1 to 1:4.

In the case of the radicals $R^1$ derived by abstracting the isocyanate groups from a prepolymer which contains urethane groups, possibly ether or ester groups and terminal isocyanate groups, the preferred radicals are those built up from the diols (b) and the diisocyanates (a2).

The preparation of monomers (a1) is known per se and is described, for example, in U.S. Pat. Nos. 2,840,589, 2,941,966, EP-A-628 541 and by P. W. Campbell and K. C. Smeltz in Journal of Organic Chemistry 28 (1963) 2069. Diisocyanatocarbodiimides can also be prepared, in a particularly gentle process with no by-products, by a heterogeneous catalysis in accordance with DE-A 2 504 400 and 2 552 350. The carbodiimidization of diisocyanates in the presence of very small amounts of phospholine oxide and with subsequent block ing of th e catalyst with acid chlorides is described in DE-A 2 653 120.

In addition to preparing the diisocyanates (a1), the diisocyanates (a2) are also generally employed directly to synthesize the polyurethanes which are present in novel polyurethane dispersions, since to synthesize the polyurethanes it is often necessary to have more isocyanate than is required to introduce the carbodiimide groups.

In addition to the isocyanates listed above, isocyanates which can be employed as compounds (a2) to synthesize the polyurethanes are those which carry not only the free isocyanate groups but also further, capped isocyanate groups, such as uretdione groups.

With a view to good filming and elasticity, compounds which are ideally suitable as diols (b) are diols (b1) which have a relatively high molecular weight of from about 500 to 5000, preferably from about 1000 to 3000 g/mol.

The diols (b1) are, in particular, polyesterpolyols which are known, for example, from Ullmanns Encyklopädie der technischen Chemie, 4th edition, Vol. 19, pp. 62 to 65. It is preferred to employ polyesterpolyols that are obtained by reacting dihydric alcohols with dibasic carboxylic acids. Instead of the free polycarboxylic acids it is also possible to use the corresponding polycarboxylic anhydrides or corresponding polycarboxylic esters of lower alcohols or mixtures thereof in order to prepare the polyesterpolyols. The polycarboxylic acids can be aliphatic, cycloaliphatic, araliphatic, aromatic or heterocyclic and can be unsubstituted or substituted, for example by halogens, and/or saturated or unsaturated. Examples are suberic, azelaic, phthalic and isophthalic acids, phthalic, tetrahydrophthalic, hexahydrophthalic, tetrachlorophthalic, endomethylenetetrahydrophthalic, glutaric and maleic anhydride, maleic and fumaric acid and dimeric fatty acids. Preference is given to dicarboxylic acids of the formula HOOC—$(CH_2)_y$—COOH where y is from 1 to 20 and is preferably an even number from 2 to 20, examples being succinic, adipic, sebacic and dodecanedicarboxylic acids.

Examples of suitable polyhydric alcohols are ethylene glycol, 1,2-propanediol, 1,3-propanediol, 1,3-butanediol, 1,4-butenediol, 1,4-butynediol, 1,5-pentanediol, neopentyl glycol, bis(hydroxymethyl)cyclohexanes such as 1,4-bis (hydroxymethyl)cyclohexane, 2-methyl-1,3-propanediol, methylpentanediols, and also diethylene glycol, triethylene glycol, tetraethylene glycol, polyethylene glycol, dipropylene glycol, polypropylene glycol, dibutylene glycol and polybutylene glycols. Preference is given to alcohols of the formula HO—$(CH_2)_x$—OH where x is from 1 to 20, preferably an even number from 2 to 20. Examples of these are ethylene glycol, 1,4-butanediol, 1,6-hexanediol, 1,8-octanediol and 1,12-dodecanediol. Neopentyl glycol is additionally preferred.

Also suitable are polycarbonatediols as can be obtained, for example, by reacting phosgene with an excess of the low molecular mass alcohols cited as structural components for the polyesterpolyols.

Also suitable are lactone-based polyesterdiols, which are homo- or copolymers of lactones, preferably hydroxy-terminal adducts of lactones with suitable difunctional starter molecules. Suitable lactones are preferably those derived from compounds of the formula HO—$(CH_2)_z$—COOH where z is from 1 to 20 and one hydrogen of a methylene unit can also be substituted by a $C_1$–$C_4$-alkyl. Examples are ε-caprolactone, β-propiolactone, γ-butyrolactone and/or methyl-ε-caprolactone and mixtures thereof. Suitable starter components are, for example, the low molecular mass dihydric alcohols cited above as structural components for the polyesterpolyols. The corresponding polymers of ε-caprolactone are particularly preferred. Lower polyesterdiols or polyetherdiols can also be employed as starters for preparing the lactone polymers. Instead of the polymers of lactones it is also possible to employ the corresponding, chemically equivalent polycondensates of the hydroxycarboxylic acids which correspond to the lactones.

Further suitable monomers (b1) are polyetherdiols. They are obtainable in particular by addition polymerization of ethylene oxide, propylene oxide, butylene oxide, tetrahydrofuran, styrene oxide or epichlorohydrin with itself, for example in the presence of $BF_3$, or by addition reaction of these compounds, alone or as a mixture or in succession, onto starter components containing reactive hydrogens, such as alcohols or amines, examples being water, ethylene glycol, 1,2-propanediol, 1,3-propanediol, 1,2-bis(4-hydroxydiphenyl)propane or aniline. Particular preference is given to polytetrahydrofuran having a molecular weight of from 240 to 5000 and, in particular, from 500 to 4500. Likewise suitable are polyhydroxyolefins, preferably those having 2 terminal hydroxyls, examples being α,ω-dihydroxypolybutadiene, α,ω-dihydroxypolymethacrylates or α,ω-dihydroxypolyacrylates as monomers (b1). Such compounds are known, for example, from EP-A-0 622 378. Further suitable polyols are polyacetals, polysiloxanes and alkyd resins.

The polyols can also be employed in the form of mixtures in a ratio of from 0.1:1 to 1:9.

The hardness and the modulus of elasticity of the polyurethanes can be raised by employing, as diols (b), not only the diols (b1) but also low molecular mass diols (b2) having a molecular weight of from about 62 to 500, preferably from 62 to 200 g/mol.

Compounds employed as monomers (b2) are in particular the structural components cited as short-chain alkanediols for the preparation of polyester polyols, preference being given to the unbranched diols having 2, 4, 6, 8, 10 or 12 carbons, and to 1,5-pentanediol and neopentyl glycol.

The proportion of the diols (b1), based on the total amount of diols (b), is preferably from 10 to 100 mol-% and the proportion of the monomers (b2), based on the total amount of diols (b), is preferably from 0 to 90 mol-%. With particular preference the ratio of the diols (b1) to the monomers (b2) is from 0.1:1 to 5:1, especially from 0.2:1 to 2:1.

In order to render the polyurethanes dispersible in water they are synthesized not only from components (a), (b) and (d) but also from monomers (c) which are different from components (a), (b) and (d) and which carry at least one isocyanate group or at least one group reactive toward isocyanate groups and, in addition, carry at least one hydrophilic group or a group which can be converted into a hydrophilic group. In the text below the term hydrophilic groups or potentially hydrophilic groups is shortened to (potentially) hydrophilic groups. The (potentially) hydrophilic groups react with isocyanates much more slowly than do the functional groups of the monomers used to build up the polymer main chain.

The proportion of components having (potentially) hydrophilic groups among the total amount of components (a), (b), (c), (d) and (e) is generally such that the molar amount of the (potentially) hydrophilic groups, based on the amount by weight of all monomers (a) to (e), is from 30 to 1000, preferably from 50 to 500 and, with particular preference, from 80 to 300 mmol/kg.

The (potentially) hydrophilic groups can be nonionic or, preferably, (potentially) ionic hydrophilic groups.

Particularly suitable nonionic hydrophilic groups are polyethylene glycol ethers comprising preferably from 5 to 100, particularly preferably from 10 to 80, ethylene oxide repeating units. The content of polyethylene oxide units is generally from 0 to 10%, preferably from 0 to 6%, based on the amount by weight of all monomers (a) to (e).

Preferred monomers having nonionic hydrophilic groups are polyethylene oxide diols, polyethylene oxide monools and the reaction products of a polyethylene glycol and a diisocyanate which carry a terminally etherified polyethylene glycol radical. Such diisocyanates and processes for their preparation are indicated in the patents U.S. Pat. Nos. 3,905,929 and 3,920,598.

Ionic hydrophilic groups are, in particular, anionic groups, such as the sulfonate, carboxylate and phosphate groups in the form of their alkali metal salts or ammonium salts, and also cationic groups such as ammonium groups, especially protonated tertiary amino groups or quaternary ammonium groups.

Potentially ionic hydrophilic groups are, in particular, those which can be converted by simple neutralization, hydrolysis or quaternization reactions into the abovementioned ionic hydrophilic groups, examples thus being carboxyl or tertiary amino groups.

(Potentially) ionic monomers (c) are described in detail in, for example, Ullmanns Encyklopädie der technischen Chemie, 4th edition, Vol. 19, pp. 311–313 and, for example, in DE-A 1 495 745.

Monomers having tertiary amino groups, in particular, are of especial practical importance as (potentially) cationic monomers (c), examples being: tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, N-aminoalkyl-dialkylamines, the alkyls and alkanediyl units of these tertiary amines consisting independently of one another of 1 to 6 carbons. Also suitable are polyethers containing tertiary nitrogens and preferably two terminal hydroxyls, as are obtainable in a conventional manner by, for example, alkoxylating amines having two hydrogens attached to the amine nitrogen, examples being methylamine, aniline and N,N'-dimethylhydrazine. Polyethers of this kind generally have a molar weight of from 500 to 6000 g/mol.

These tertiary amines are converted either with acids, preferably strong mineral acids such as phosphoric acid, sulfuric acid or hydrohalic acids, or strong organic acids, or by reaction with appropriate quaternizing agents such as $C_1$–$C_6$-alkyl halides or benzyl halides, for example bromides or chlorides, into the ammonium salts.

Suitable monomers having (potentially) anionic groups are, conventionally, aliphatic, cycloaliphatic, araliphatic or aromatic carboxylic and sulfonic acids which carry at least one alcoholic hydroxyl or at least one primary or secondary amino group. Preference is given to dihydroxyalkylcarboxylic acids, especially those having 3 to 10 carbons, as are described, inter alia, in U.S. Pat. No. 3,412,054. Particular preference is given to compounds of the formula (d1)

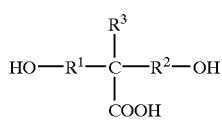

(d1)

where $R^1$ and $R^2$ are $C_1$–$C_4$-alkanediyl and $R^3$ is $C_1$–$C_4$-alkyl, and especially to dimethylolpropionic acid (DMPA).

Corresponding dihydroxysulfonic and dihydroxyphosphonic acids, such as 2,3-dihydroxypropanephosphonic acid, are also suitable.

Compounds otherwise suitable are dihydroxy compounds having a molecular weight of more than 500 up to 10,000 g/mol and at least 2 carboxylate groups, which are known from DE-A 3 911 827. They are obtainable by reacting dihydroxy compounds with tetracarboxylic dianhydrides, such as pyromellitic dianhydride or cyclopentanetetracarboxylic dianhydride, in a molar ratio of from 2:1 to 1.05:1 in a polyaddition reaction. Particularly suitable dihydroxy compounds are the monomers (b2) listed as chain extenders, and the diols (b1).

Suitable monomers (c) having isocyanate-reactive amino groups are amino carboxylic acids such as lysine, β-alanine or the adducts specified in DE-A-2034479 of aliphatic diprimary diamines with α,β-unsaturated carboxylic or sulfonic acids.

Such compounds conform for example to the formula (d2)

$$H_2N-R^4-NH-R^5-X \qquad (d2)$$

where
$R^4$ and $R^5$ independently of one another are a $C_1$–$C_6$-alkanediyl, preferably ethylene,
and X is COOH or $SO_3H$.

Particularly preferred compounds of the formula (d2) are N-(2-aminoethyl)-2-aminoethanecarboxylic acid and N-(2-aminoethyl)-2-aminoethanesulfonic acid and the corresponding alkali metal salts, Na being the particularly preferred counterion.

Also particularly preferred are the adducts of the abovementioned aliphatic diprimary diamines with 2-acrylamido-2-methylpropanesulfonic acid, as are described, for example, in DE-C 1 954 090.

Insofar as monomers having potentially ionic groups are employed their conversion to the ionic form can take place before or during, but preferably after, the isocyanate polyaddition reaction, since the solubility of the ionic monomers in the reaction mixture is in many cases poor. With particular preference, the sulfonate or carboxylate groups are in the form of their salts with an alkali metal ion or ammonium ion as counterion.

The monomers (d), which are different from the monomers (a) to (c), serve generally for crosslinking or chain extension. They are generally non-phenolic alcohols with a functionality of more than two, amines having 2 or more primary and/or secondary amino groups, and compounds which in addition to one or more alcoholic hydroxyls carry one or more primary and/or secondary amino groups.

Examples of alcohols having a functionality of more than 2 which can be used to establish a certain degree of branching or crosslinking are trimethylolpropane, glycerol and sugar.

Also suitable are monoalcohols which in addition to the hydroxyl carry a further isocyanate-reactive group, such as monoalcohols having one or more primary and/or secondary amino groups, for example monoethanolamine.

Polyamines having 2 or more primary and/or secondary amino groups are employed in particular when chain extension and/or crosslinking is to take place in the presence of water, since amines generally react more quickly with isocyanates than do alcohols or water. This is in many cases necessary when the desire is for aqueous dispersions of crosslinked polyurethanes, or polyurethanes of high molar weight. In such cases a procedure is followed in which prepolymers with isocyanate groups are prepared, are rapidly dispersed in water and then are subjected to chain extension or crosslinking by adding compounds having two or more isocyanate-reactive amino groups.

Amines suitable for this purpose are, in general, polyfunctional amines with a molar weight in the range from 32 to 500 g/mol, preferably from 60 to 300 g/mol, having at least two amino groups selected from the group consisting of primary and secondary amino groups. Examples are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane.

The amines can also be employed in blocked form, for example in the form of the corresponding ketimines (see eg. CA-A-1 129 128), ketazines (cf. eg. U.S. Pat. No. 4,269,748) or amine salts (see U.S. Pat. No. 4,292,226). Oxazolidines as well, as are used, for example, in U.S. Pat. No. 4,192,937, are capped polyamines which can be employed to chain-extend the prepolymers in the preparation of the novel polyurethanes. When capped polyamines of this kind are used they are generally mixed with the prepolymers in the absence of water and this mixture is subsequently mixed with the dispersion water or with a portion thereof so that the corresponding polyamines are liberated by hydrolysis.

It is preferred to use mixtures of diamines and triamines, especially mixtures of isophoronediamine (IPDA) and diethylenetriamine (DETA).

The polyurethanes contain preferably from 1 to 30, especially from 4 to 25 mol-%, based on the total amount of components (b) and (d), of a polyamine having at least 2 isocyanate-reactive amino groups, as monomers (d).

Examples of alcohols having a functionality of more than 2 which can be used to establish a certain degree of branching or crosslinking are trimethylolpropane, glycerol and sugars.

For the same purpose it is also possible, as monomers (d), to employ isocyanates with a functionality of more than two. Examples of commercial compounds are the isocyanurate or the biuret of hexamethylene diisocyanate.

Monomers (e), which can additionally be used if desired, are monoisocyanates, monoalcohols and monoprimary and monosecondary amines. In general their proportion is not more than 10 mol-%, based on the overall molar amount of the monomers. These monofunctional compounds usually carry other functional groups, such as olefinic groups or carbonyl groups, and serve to introduce functional groups into the polyurethane which enable the polyurethane to be dispersed or crosslinked or to undergo further polymer-analogous reaction. Monomers suitable for this purpose are those such as isopropenyl-α,α-dimethylbenzyl isocyanate (TMI) and esters of acrylic or methacrylic acid, such as hydroxyethyl acrylate or hydroxyethyl methacrylate.

Coatings having a particularly good profile of properties are obtained in particular when the monomers (a1) employed comprise essentially only aliphatic diisocyanates, the proportion of HMDI in particular being at least 33 mol-%, cycloaliphatic diisocyanates or TMXDI, and when the monomer (b1) employed essentially comprises only a polyesterdiol synthesized from the abovementioned aliphatic diols and diacids.

An excellent supplement to this monomer combination, as component (c), comprises alkali metal salts of diaminosulfonic acids—very particularly N-(2-aminoethyl)-2-aminoethanesulfonic acid and/or its corresponding alkali metal salts, the Na salt being the best suited—and, as component (d), a mixture of DETA/IPDA.

In the field of polyurethane chemistry it is generally known how the molecular weight of the polyurethanes can be adjusted by choosing the proportions of the co-reactive monomers and by the arithmetic mean of the number of reactive functional groups per molecule.

Components (a) to (e) and their respective molar amounts are normally so chosen that the ratio A:B, where
A) is the molar amount of isocyanate groups and
B) is the sum of the molar amount of the hydroxyls and the molar amount of the functional groups which are able to react with isocyanates in an addition reaction, is from 0.5:1 to 2:1, preferably from 0.8:1 to 1.5 and, with particular preference, from 0.9:1 to 1.2:1. With very particular preference the ratio A:B is as close as possible to 1:1.

The monomers (a) to (e) employed carry on average usually from 1.5 to 2.5, preferably from 1.9 to 2.1 and, with particular preference, 2.0 isocyanate groups and/or functional groups which are able to react with isocyanates in an addition reaction.

The polyurethanes present in the novel dispersion preferably contain no active amounts of acylurea groups which can be obtained by reacting the carbodiimide groups of the formula (I) that are present in the polyurethanes with carboxylic acids, especially those of the formula RCOOH where R is a saturated or unsaturated hydrocarbon radical.

The ratio of acyl groups to groups of the formula (I) is at least less than 4:1, preferably less than 1:1 and, with particular preference, less than 0.2:1.

The polyaddition of components (a) to (e) takes place in general at from 20 to 180° C., preferably from 50 to 150° C., under atmospheric pressure or under the autogenous pressure.

The reaction times required may extend from a few minutes to several hours. It is known in the field of polyurethane chemistry how the reaction time is influenced by a host of parameters such as temperature, monomer concentration and monomer reactivity.

The reaction of the diisocyanates can be accelerated using the customary catalysts, such as dibutyltin dilaurate, tin(II) octoate or diazabicyclo [2.2.2]octane.

Stirred vessels are suitable polymerization apparatus, especially when solvents are used to provide low viscosity and good heat dissipation.

Preferred solvents are of unlimited miscibility with water, have a boiling point from 40 to 100° C. under atmospheric pressure, and react slowly, if at all, with the monomers.

The dispersions are usually prepared by one of the following methods:

In the acetone process an ionic polyurethane is prepared from components (a) to (c) in a water-miscible solvent which boils at below 100° C. under atmospheric pressure. Water is added until a dispersion is formed in which water is the coherent phase.

The prepolymer mixing process differs from the acetone process in that rather than a fully reacted (potentially) ionic polyurethane it is a prepolymer carrying isocyanate groups which is prepared first of all. In this case the components are chosen such that the above-defined ratio A:B is greater than 1.0 to 3, preferably 1.05 to 1.5. The prepolymer is first dispersed in water and then crosslinked, possibly by reacting the isocyanate groups with amines which carry more than 2 isocyanate-reactive amino groups or is chain-extended with amines which carry 2 amino groups which are reactive toward isocyanates. Chain extension also takes place when no amine is added. In this case, isocyanate groups are hydrolyzed to amino groups, which react with residual isocyanate groups of the prepolymers and so extend the chain.

If a solvent has been used in preparing the polyurethane, it is usual to remove the majority of the solvent from the dispersion, for example by distillation under reduced pressure. The dispersions preferably have a solvent content of less than 10% by weight and are, with particular preference, free from solvents.

The dispersions generally have a solids content of from 10 to 75, preferably from 20 to 65, % by weight and a viscosity of from 10 to 500 m Pas (measured at 20° C. and at a shear rate of 250 s$^{-1}$).

Hydrophobic auxiliaries, which in some cases are difficult to disperse homogeneously in the finished dispersion, examples being phenol condensation resins formed from aldehydes and phenol or phenol derivatives or epoxy resins and other polymers set out, for example, in DE-A-3903538, 43 09 079 and 40 24 567, and which are used, for example, as adhesion promoters in polyurethane dispersions, can be added to the polyurethane or to the prepolymer, prior to dispersion, in accordance with the methods described in the two abovementioned documents.

The polyurethane dispersions may include customary commercial auxiliaries and additives such as blowing agents, antifoams, emulsifiers, thickeners, thixotropic agents and colorants, such as dyes and pigments.

The novel dispersions are suitable for coating articles made from metal, plastic, paper, textile, leather or wood, by applying the dispersion in the form of a film to these articles by the customary techniques, ie. by spraying or knife-coating, for example, and drying the dispersion.

The dispersions are particularly suitable for coating articles made from plastic, paper, textile or leather if the dispersion is beaten to a foam beforehand by known methods and coating is carried out using this foam.

The aqueous dispersions are suitable especially for the preparation of formulations as described in DE-A-19 605 311. In accordance with DE-A-19 605 311 these formulations are used to coat textiles or webs. Through this treatment these materials become flameproof, waterproof and permeable to water vapor.

To produce the coated textiles or webs the novel aqueous dispersions are applied by customary methods to the textile substrate materials, for example by knife-coating or brushing, and the coated substrate material is then dried.

A preferred procedure is as follows:

The aqueous dispersion is applied in foam form to the substrate material, since this considerably improves the vapor permeability. For this purpose the dispersion, following the addition of the foam stabilizer and any thickener and other additives, such as flameproofing agents, is foamed mechanically. This can be done in a foam mixer with the input of high shear forces. An alternative is to carry out foaming in a foam generator by blowing compressed air in. Foaming is preferably carried out using a foam generator.

The foamed coating composition is then applied to the substrate material with customary coating equipment, such as a coating blade or other foam applicators. Application can be made to one or both sides, preferably to one side. The amount applied per side is from 20 to 150 g/m$^2$, in particular from 50 to 90 g/m$^2$.

With amounts below 20 g/m$^2$ the substrate, although having good vapor permeability for a low cost, is not very waterproof. With amounts above 150 g/m$^2$ there are instances of cracking in the course of drying.

Articles made from metal, plastic, paper, leather or wood can likewise be bonded adhesively to other articles, preferably the abovementioned articles, by applying the novel aqueous dispersion in the form of a film to one of said articles and joining this article, before or after the film has dried, to another article.

Articles made from textile, leather or paper can be impregnated with the novel dispersions by soaking these articles with the aqueous dispersion and then drying them.

EXPERIMENTAL SECTION

EXAMPLE 1

400 g (0.200 mol) of a polyesterol made from adipic acid, neopentyl glycol and hexanediol, having an OH number of 56, and 2.5 g (0.003 mol) of a carbodiimide of TMXDI having an NCO content of 10.0% by weight and a CDI content of 14.2% by weight were charged at 50° C. to a stirred vessel. 35.4 g (0.1594 mol) of IPDI, 42.9 g (0.1624 mol) of HMDI and 80 g of acetone were added. The mixture was stirred at 90° C. for 60 minutes, 0.15 g of DBTL was added, and stirring was continued for 120 minutes. The mixture was then diluted with 500 g of acetone and simultaneously cooled to 50° C. The NCO content of the solution was 0.97% (calc. 0.94%).

Following the addition of 22.5 g (0.0534 mol) of a 50% strength aqueous solution of the Na salt of aminoethylaminoethanesulfonic acid the mixture was dispersed within a period of 5 minutes by adding 800 g of water. After dispersion, a solution of 3.9 g (0.0379 mol) of DETA and 1.8 g (0.0106 mol) of IPDA in 50 g of water was added. Distillation of the acetone gave a fine aqueous PU dispersion with a solids content of about 40%.

CDI content: 17.2 mmol/kg

EXAMPLE 2

400 g (0.200 mol) of a polyesterol made from adipic acid, neopentyl glycol and hexanediol, having an OH number of 56, and 5.0 g (0.006 mol) of a carbodiimide of TMXDI having an NCO content of 10.0% by weight and a CDI content of 14.2% by weight were charged at 50° C. to a stirred vessel. 34.8 g (0.1565 mol) of IPDI, 42.9 g (0.1624 mol) of HMDI and 80 g of acetone were added. The mixture was stirred at 90° C. for 60 minutes, 0.15 g of DBTL was added, and stirring was continued for 120 minutes. The mixture was then diluted with 500 g of acetone and simultaneously cooled to 50° C. The NCO content of the solution was 0.99% (calc. 0.94%). Following the addition of 22.5 g (0.0534 mol) of a 50% strength aqueous solution of the Na salt of aminoethylaminoethanesulfonic acid the mixture was dispersed within a period of 5 minutes by adding 800 g of water. After dispersion, a solution of 3.9 g (0.0379 mol) of DETA and 1.8 g (0.0106 mol) of IPDA in 50 g of water was added. Distillation of the acetone gave a fine aqueous PU dispersion with a solids content of about 40%.

CDI content: 35.5 mmol/kg

Comparative Example 1 (without carbodiimide)

400 g (0.200 mol) of a polyesterol made from adipic acid, neopentyl glycol and hexanediol, having an OH number of 56 were charged at 50° C. to a stirred vessel. 36.1 g (0.1624 mol) of IPDI, 42.9 g (0.1624 mol) of HMDI and 80 g of acetone were added. The mixture was stirred at 90° C. for 60 minutes, 0.15 g of DBTL was added, and stirring was continued for 120 minutes. The mixture was then diluted with 500 g of acetone and simultaneously cooled to 50° C. The NCO content of the solution was 0.99% (calc. 0.94%). Following the addition of 22.5 g (0.0534 mol) of a 50% strength aqueous solution of the Na salt of aminoethylaminoethanesulfonic acid the mixture was dispersed within a period of 5 minutes by adding 800 g of water. After dispersion, a solution of 3.9 g (0.0379 mol) of DETA and 1.8 g (0.0106 mol) of IPDA in 50 g of water was added. Distillation of the acetone gave a fine aqueous PU dispersion with a solids content of about 40%.

Comparative Example 2 (carbodiimide added to the dispersion)

To 500 g of the dispersion from Comparative Example 1 there were added 5.6 g of a water-soluble carbodiimide prepared according to Example 3 of EP 628 541, having a carbodiimide content of 1250 mmol/kg.

CDI content: 35.0 mmol/kg

TESTING

For testing, films with a thickness of about 1 mm were cast from the dispersions and were left to dry at 23° C. for 3 days. Immediately after their production, and after storage for 7 days at 70° C. and 90% relative humidity, their tensile strength was measured in accordance with DIN 53 504.

The results of testing are given in Table 1.

TABLE 1

|  | Tensile strength (N/mm$^2$) immediate | 7d, 70° C., 90% rel. humidity | Change [%] |
| --- | --- | --- | --- |
| Example |  |  |  |
| 1 | 12 | 17 | +42 |
| 2 | 12 | 17 | +42 |
| Comparative Example |  |  |  |
| 1 | 10 | 9 | −10 |
| 2 | 8.3 | 7,0 | −16 |

It is surprising that the tensile strength not only does not decrease as a result of storage in warm and humid conditions but in fact even increases.

We claim:

1. An aqueous dispersion comprising a polyurethane (1), composed of
   a1) diisocyanates
   a1.1) which comprise structural units of the formula (I)

—N=C=N—  (I)

and, optionally, those
   a1.2) which are free from structural units of the formula (I),
   b1) diols, of which
   b1.1) from 10 to 100 mol-%, based on the total amount of the diols (b1), have a molecular weight of from 500 to 5000 g/mol, and
   b1.2) from 0 to 90 mol-%, based on the total amount of the diols (b1), have a molecular weight of from 62 to 500 g/mol,
   c1) monomers which are chemically different from the monomers (a1) and (b1) and which have at least one isocyanate group or at least one isocyanate-reactive group and which, furthermore, carry at least one hydrophilic group or one potentially hydrophilic group, thereby rendering the polyurethanes dispersible in water,
   d1) optionally, further polyfunctional compounds which are different from the monomers (a1) to (c1) and which have reactive groups which are alcoholic hydroxyls, primary or secondary amino groups or isocyanate groups, and
   e1) optionally, monofunctional compounds which are different from the monomers (a1) to (d1) and which have a reactive group which is an alcoholic hydroxyl, a primary or secondary amino group or an isocyanate group.

2. An aqueous dispersion as claimed in claim 1, wherein the content of carbodiimide structural units is from 5 to 200 mmol/kg based on the polyurethane.

3. An aqueous dispersion as claimed in claim 1, wherein the polyisocyanate (a1.1) is tetramethylxylylene diisocyanate (TMXDI).

4. An aqueous dispersion as claimed in claim 1, wherein the diols (b1.1) are polyesterols.

5. An aqueous dispersion suitable for preparing coated textiles, comprising, based on the solids content,
   A) from 10 to 100% by weight of a polyurethane (1) which carries hydrophilic groups which render the polyurethane dispersible in water
   B) optionally, from 5 to 90% by weight of a polymer (B) which is
   B1) a polyurethane (2) different from the polyurethane (1) and composed of
   a2) diisocyanates containing no carbodiimide groups
   b2) diols, of which
   b2.1) from 10 to 100 mol-%, based on the total amount of the diols (b1), have a molecular weight from 500 to 5000 g/mol, and
   b2.2) from 0 to 90 mol-%, based on the total amount of the diols (b2), have a molecular weight of from 60 to 500 g/mol,
   c2) monomers which are chemically different from the monomers (a2) and (b2) and which have at least one isocyanate group or at least one isocyanate-reactive group and which, furthermore, carry at least one hydrophilic group or one potentially hydrophilic group, thereby rendering the polyurethanes dispersible in water,
   d2) optionally, further polyfunctional compounds which are different from the monomers (a2) to (c1) and which have reactive groups which are alcoholic hydroxyls, primary or secondary amino groups or isocyanate groups, and
   e2) optionally, monofunctional compounds which are different from the monomers (a2) to (d2) and which have a reactive group which is an alcoholic hydroxyl, a primary or secondary amino group or an isocyanate group, or B2) is a polymer prepared by free-radically initiated polymerization (polymer 3) which is composed of
   a3) from 30 to 100 parts by weight of at least one monomer selected from the group consisting of $C_1$- to $C_{20}$-alkyl(meth)acrylates, vinyl esters of carboxylic acids having up to 20 carbon atoms, ethylenically unsaturated nitriles, vinylaromatic compounds having up to 20 carbon atoms, vinyl halides, and aliphatic hydrocarbons having 2 to 8 carbon atoms and 1 or 2 double bonds (monomers a3), and
   b3) from 0 to 70 parts by weight of other compounds I having at least one ethylenically unsaturated group (monomers b3)
   C) optionally, from 0.1 to 5% by weight of an emulsifier
   D) optionally, from 0.1 to 10% by weight of an amino resin or phenolic resin
   E) optionally, from 1 to 30% by weight of a flame retardant
   F) optionally, from 1 to 70% by weight of a kaolin, and
   G) optionally, from 1 to 30% by weight of an oleophobicizer.

6. A process for coating an article made from metal, plastic, paper, textile, leather or wood, which comprises applying an aqueous dispersion as claimed in claim 1 in the form of a film to said article and drying the dispersion.

7. A process for bonding an article made from metal, plastic, paper, textile, leather or wood, which comprises applying an aqueous dispersion as claimed in claim 1 in the form of a film to such an article and joining the article, before or after the film has dried, to another article.

8. A process for impregnating an article made from textile, leather or paper, which comprises soaking said article with an aqueous dispersion as claimed in claim 1, and then drying it.

9. A process for producing coated textiles, which comprises

I) subjecting an aqueous dispersion as claimed in claim 1 to thickening to form a paste or to mechanical foaming to form a foam, II) applying the foam or paste to the textile substrate material directly or indirectly (transfer) and drying it, and III) if appropriate, compressing the dried foam.

10. An article coated, bonded or impregnated with an aqueous dispersion as claimed in claim 1.

11. A method for architecturally preserving an object, comprising applying to said object a coated textile article as a roofing membrane or as a siding membrane.

* * * * *